Patented Nov. 30, 1937

2,100,422

UNITED STATES PATENT OFFICE 2,100,422

PRESERVING AND WRAPPING CHEESE

Herman Wyssbrod, Louisville, Ky.

No Drawing. Application December 10, 1936, Serial No. 115,266

2 Claims. (Cl. 99—178)

This invention relates to a novel method of preserving and packaging cheese and more particularly to such a method wherein pieces of cheese of predetermined weight are so processed that the delicate flavor of the cheese will be preserved for long periods of time.

An object of the invention is to preserve cheese, particularly Swiss cheese, so that it will retain its freshness, bouquet, flavor and consistency during storage or while on a store shelf.

A further object of the invention is to prepare Swiss cheese and sell the cheese in half pound or pound packages for family use in such a manner that there will be no waste to the consumer.

Heretofore, it has been proposed to place pieces of cheese in air tight containers, paper or tin foil envelopes but none of these prior devices prevent the drying out of the cheese and the loss of its original softness, bouquet and flavor.

In carrying out this method of preserving and packaging cheese a cheese wheel of properly cured and aged cheese is cut into portions of the proper weight and size, after allowing for the removal of any rind or mold. The blocks or wedges of cheese, after the rind has been completely removed, are first sprayed or lightly dusted with powdered salt after which these slightly salted individual pieces are carefully and completely wrapped in squares of sterilized cheese cloth which have been previously saturated with light white wine. The initially salted and wine wrapped pieces are then further wrapped in sterile cheese cloth which has been slightly moistened with glycerine after which the twice wrapped pieces are completely enfolded in a strong tin foil and thereafter sealed in an outer envelope of glassine paper, Cellophane or the like and packed in proper quantities in boxes for shipment. This treatment of the cheese ensures that it will retain all of its delectable qualities over long periods of storage.

The salt applied to the surface of the cheese tends to further cure the cheese after being cut from the wheel and retards mold formation, while the first sterile cheese cloth, saturated in light white wine, gives the cheese a delightful flavor and prevents any tendency for the cheese to dry out.

The second covering of sterile cheese cloth, moistened with glycerine, also assists in preventing drying out of the cheese and helps to keep the piece soft. The use of tin foil to cover the package is, of course old per se but its novelty in this connection is as an envelope for the previous steps.

For shipment and sale it is preferable to completely seal the package in glassine paper or Cellophane as both of these materials will permit any advertising matter printed on the tin foil to be visible, aside from excluding air contacting the contents of the package. For storage or shipment, the cheese packages, as treated and wrapped according to this invention, are packed in paper or wooden cartons.

What I claim is:—

1. The method of preserving the freshness of Swiss cheese which comprises removing all rind and mold from the cheese, applying a light covering of salt to the surfaces of the cheese, wrapping the salted cheese in a cloth previously moistened with white wine, further wrapping the cheese in a second cloth previously moistened with glycerine and thereafter sealing said wrapped cheese in an impervious wrapper.

2. The method of preparing Swiss cheese to ensure its retention of flavor, bouquet and freshness over long periods of time which includes cutting predetermined weight pieces from a cheese wheel, removing rind and mold from said pieces, lightly coating said piece with salt, wrapping said pieces in sterile gauze saturated with light white wine, further wrapping said pieces in sterile gauze saturated with glycerine, still further wrapping said pieces in tin foil and sealing said wrapped pieces in a transparent impervious wrapper.

HERMAN WYSSBROD.